:::
(12) United States Patent
Miao et al.

(10) Patent No.: US 12,101,170 B2
(45) Date of Patent: Sep. 24, 2024

(54) DOPPLER SHIFT COMPENSATION METHOD AND DEVICE

(71) Applicant: DATANG MOBILE COMMUNICATIONS EQUIPMENT CO., LTD., Beijing (CN)

(72) Inventors: Deshan Miao, Beijing (CN); Shaohui Sun, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 324 days.

(21) Appl. No.: 17/622,599

(22) PCT Filed: Jun. 22, 2020

(86) PCT No.: PCT/CN2020/097540
§ 371 (c)(1),
(2) Date: Dec. 23, 2021

(87) PCT Pub. No.: WO2020/259454
PCT Pub. Date: Dec. 30, 2020

(65) Prior Publication Data
US 2022/0360320 A1  Nov. 10, 2022

(30) Foreign Application Priority Data
Jun. 28, 2019  (CN) .......................... 201910579286.6

(51) Int. Cl.
*H04B 7/185* (2006.01)
*H04W 56/00* (2009.01)

(52) U.S. Cl.
CPC ...... *H04B 7/18513* (2013.01); *H04W 56/004* (2013.01)

(58) Field of Classification Search
CPC .......................... H04B 7/18513; H04W 56/004
See application file for complete search history.

(56) References Cited

U.S. PATENT DOCUMENTS 9,516,617 B1  12/2016 Dollahan
10,505,624 B2  12/2019 Fourtet et al.
(Continued)

FOREIGN PATENT DOCUMENTS

CA  2970923 A1  3/2015
CN  102082745 A  6/2011
(Continued)

OTHER PUBLICATIONS

Nokia, "Doppler Compensation, Uplink Timing Advance, Random Access and UE Location in NTN", 3GPP TSG RAN WG1 Meeting #98bis R1-1911220, Oct. 5, 2019.
(Continued)

*Primary Examiner* — Bailor C Hsu
(74) *Attorney, Agent, or Firm* — Meunier Carlin & Curfman LLC

(57) ABSTRACT

The present application relates to a Doppler shift compensation method and device. The method includes: indicating by a network side, to a terminal side, Doppler compensation reference information preset for each beam cell in a satellite coverage area, so that a terminal accessing the beam cell can timely obtain a terminal side Doppler compensation value.

19 Claims, 6 Drawing Sheets

:::

(56) References Cited

U.S. PATENT DOCUMENTS

| | | | |
|---|---|---|---|
| 11,108,438 B2 | 8/2021 | Hou et al. | |
| 11,929,950 B2* | 3/2024 | Sun | H04W 52/242 |
| 2008/0272960 A1* | 11/2008 | Kishimoto | G01S 19/235 |
| | | | 342/357.62 |
| 2011/0098073 A1* | 4/2011 | Park | H04W 56/0035 |
| | | | 455/509 |
| 2011/0116386 A1* | 5/2011 | Blanchard | H04B 7/155 |
| | | | 370/242 |
| 2012/0056781 A1* | 3/2012 | Kong | G01S 19/252 |
| | | | 342/357.42 |
| 2016/0173162 A1 | 6/2016 | Lundstedt et al. | |
| 2019/0260462 A1* | 8/2019 | Axmon | H04B 7/18506 |
| 2020/0036435 A1* | 1/2020 | Ravishankar | H04B 7/18515 |
| 2020/0132859 A1* | 4/2020 | Petrovic | G01S 5/0027 |
| 2020/0313755 A1* | 10/2020 | Chuang | H04B 7/1855 |
| 2020/0350983 A1* | 11/2020 | Alasti | H04L 5/0007 |
| 2022/0039037 A1* | 2/2022 | Tian | H04W 56/004 |
| 2022/0255619 A1* | 8/2022 | Yu | H04B 7/01 |

FOREIGN PATENT DOCUMENTS

| | | |
|---|---|---|
| CN | 102375148 A | 3/2012 |
| CN | 103220773 A | 7/2013 |
| CN | 104199059 A | 12/2014 |
| CN | 104378317 A | 2/2015 |
| CN | 105871495 A | 8/2016 |
| CN | 108259079 A | 7/2018 |
| CN | 109005135 A | 12/2018 |
| CN | 109120561 A | 1/2019 |
| CN | 109683177 A | 4/2019 |
| CN | 109889460 A | 6/2019 |
| CN | 110545247 A | 12/2019 |
| EP | 2214328 A2 | 8/2010 |
| KR | 20140126345 A | 10/2014 |
| KR | 20160013871 A | 2/2016 |
| KR | 20180136819 A | 12/2018 |
| WO | 2018109411 A1 | 6/2018 |

OTHER PUBLICATIONS

Ericsson, "Feature lead summary#4 on physical layer control procedures for NTN", 3GPP TSG RAN WG1 Meeting #96bis R1-1905861, Apr. 15, 2019.

Yanhua, Comparison and analysis of Doppler frequency shift compensation methods, China Master's Theses Full-text Database, Information Technology Special Issue, Jan. 15, 2014.

Nokia, Nokia Shanghai Bell, "Overview for NR supporting NTN," R1-1901722, 3GPP TSG RAN WG1 Meeting #96, Athens, Greece, Feb. 25-Mar. 1, 2019.

Mediatek Inc., "Doppler, Timing Advance and RACH in NR-NTN," R1-1906464, 3GPP TSG RAN WG1 Meeting #97, Reno, Nevada, USA May 13-May 17, 2019.

* cited by examiner

Single-satellite multibeam

DOPPLER SHIFT COMPENSATION METHOD AND DEVICE

CROSS REFERENCE TO RELATED APPLICATIONS

The present disclosure is a US National Stage of International Application No. PCT/CN2020/097540, filed on Jun. 22, 2020, which claims the priority of the Chinese Patent Application No. 201910579286.6, filed to the China Patent Office on Jun. 28, 2019 and entitled "DOPPLER SHIFT COMPENSATION METHOD AND DEVICE", the entire contents of which are incorporated herein by reference.

FIELD

The present disclosure relates to the field of communications, in particular to a Doppler shift compensation method and device.

BACKGROUND

In a low-orbit satellite communication system, a satellite moves around the earth at a speed of about 7.9 km/s, which will bring a huge Doppler shift. In an orthogonal frequency division multiplexing (OFDM) system, Doppler shift will cause severe degradation of user performance. This change in Doppler shift will not only affect a user link between the satellite and a terminal, but also affect a feeder link between the satellite and a gateway station. Therefore, in the satellite communication system, problems about compensation and correction of the Doppler shift need to be solved.

As shown in FIG. 1, there are two working modes in satellite communications. One is a bent pipe communication mode (hereinafter referred to as a bent pipe mode), where the satellite only forwards signals transparently without any processing, and the terminal communicates with the gateway station. The other is a regeneration communication mode (hereinafter referred to as a regeneration mode), where the satellite can detect out information of a received signal and process and forward it, complete the function of a base station, and connect the terminal and the gateway station. In satellite communications, a communication link between the terminal and the satellite is called the user link, and a communication link between the satellite and the gateway station is called the feeder link, as shown in FIG. 1.

As shown in FIGS. 2 and 3, in practical applications, a satellite may use a plurality of satellite beams, and a satellite beam usually covers a ground cell. The gateway station may estimate a physical location of the satellite on the basis of ephemeris information (at least including orbit information of the satellite).

In the bent pipe mode, a two-segment link architecture (including the user link and the feeder link) is adopted. A signal sent by the terminal needs to pass through the satellite, and then is forwarded by the satellite to the gateway station; and the gateway station and the ground base station have the same functions. Similarly, a signal sent by the gateway station also needs to pass through the satellite, and the satellite needs to forward the signal of the gateway station to the terminal. The forward processing of the satellite is mainly on a radio frequency side, through frequency conversion, the received signal is converted to another frequency, and power is amplified. The requirement of the bent pipe mode for the satellite is relatively simple.

For bent pipe communication, the terminal and the gateway station will experience the Doppler shift of the feeder link and the user link during information communication between the terminal and the gateway station. Generally speaking, the Doppler shift of the feeder link is compensated by the gateway station, because it is not easy for the terminal to obtain a communication frequency of the feeder link and location information of the gateway station. A Doppler shift value of the user link is still very large, generally reaching the order of hundreds of hertz in a high frequency band, so it still may cause a decrease in detection performance. In this case, a commonly used compensation method is: pre-compensation is performed on the network side for downlink signals, and post-compensation is performed during receiving on the network side for uplink signals. At this moment, the network side (the base station or the gateway station) usually performs Doppler shift compensation on the basis of a center point of a beam as a reference point.

In practical applications, the network side can perform Doppler shift compensation on the basis of different reference points. The reference points can be on the ground or on the satellite.

In the bent pipe mode, the network side can only compensate for the Doppler shift of the feeder link, or it can compensate for the Doppler shift of the feeder link plus a part of common Doppler shift of the user link. Similarly, in the regeneration mode, the satellite and the terminal communicate directly, and the satellite can also be in data communication with the gateway station on the ground. Therefore, the satellite is equivalent to a base station, and the Doppler shift of the communication link between the satellite and the terminal can be subjected to Doppler shift compensation on the network side (processed by the satellite). Similarly, the Doppler shift compensation for the satellite side can adopt different reference points, or a plurality of beams of a satellite can adopt the same Doppler shift compensation value.

However, different Doppler shift compensation mechanisms on the network side bring certain constraints on the realization of Doppler compensation on the terminal side, because only when the Doppler shift compensation mechanisms on the network side and the terminal side are consistent, can the impact of the Doppler shift be eliminated to the maximum extent. However, in the prior art, it is impossible to ensure that the terminal side and the network side can jointly compensate for and eliminate the Doppler shift caused by satellite movement while maintaining the flexibility of the implementation method of Doppler compensation on the network side, and thus the communication performance of a system cannot be ensured.

SUMMARY

Embodiments of the present disclosure provide a Doppler shift compensation method and device, so as to ensure the consistency of a terminal side and a network side in Doppler shift compensation.

The specific technical solutions provided by the embodiments of the present disclosure are as follows.

A Doppler shift compensation method includes: obtaining, by a network device, Doppler compensation reference information set for at least one beam cell; and notifying, by the network device, a terminal accessing the at least one beam cell of the Doppler compensation reference information, and triggering the terminal to obtain a corresponding terminal side Doppler compensation value on the basis of the Doppler compensation reference information, and to perform terminal side Doppler shift compensation for a communication link between a satellite and the terminal on the basis of the terminal side Doppler compensation value.

Optionally, the notifying, by the network device, the terminal accessing the at least one beam cell of the Doppler compensation reference information includes: notifying the terminal of the Doppler compensation reference information through a broadcast message in a case of determining that the terminal initially accesses the at least one beam cell; or notifying the terminal of the Doppler compensation reference information through dedicated signaling in a case of determining that the terminal is switched from another beam cell to the at least one beam cell.

Optionally, the dedicated signaling is any one of radio resource control (RRC) indication signaling, downlink control information (DCI) indication signaling, or media access control control element (MAC CE) indication signaling.

Optionally, the Doppler compensation reference information includes: a Doppler compensation reference angle; the Doppler compensation reference angle is an included angle between a movement direction of the satellite and a connecting line between the satellite and a reference point; and the Doppler compensation reference angle is used for calculating a network side Doppler compensation value used in a case that the network device performs network side Doppler shift compensation for a communication link between the satellite and a terminal user; or the Doppler compensation reference information includes: a network side Doppler compensation value used in a case that the network device performs network side Doppler shift compensation for the communication link between the satellite and the terminal.

Optionally, the network side Doppler compensation value includes: a Doppler shift pre-compensation value for a downlink transmitted signal, or, a Doppler shift post-compensation value for an uplink received signal.

Optionally, the method further includes: determining, by the network device, the corresponding network side Doppler compensation value on the basis of the Doppler compensation reference information; and performing, by the network device, the network side Doppler shift compensation for the communication link between the satellite and the terminal on the basis of the network side Doppler compensation value.

Optionally, the method further includes: further performing, by the network device, Doppler shift compensation for a feeder link in a case that a current working mode is a bent pipe communication mode.

Optionally, the performing, by the network device, the network side Doppler shift compensation for the communication link between the satellite and the terminal on the basis of the network side Doppler compensation value includes: performing network side Doppler shift pre-compensation for the downlink transmitted signal on the basis of the network side Doppler compensation value, or, performing network side Doppler shift post-compensation for the uplink received signal on the basis of the network side Doppler compensation value.

Optionally, the method further includes: performing, by the network device, network side Doppler shift compensation for a communication link between the satellite and a terminal user on the basis of Doppler compensation reference information pre-defined by the network device and the terminal in a case that the network device notifies the terminal of the Doppler compensation reference information by default in the at least one beam cell.

Optionally, the method further includes: updating, by the network device, the Doppler compensation reference information of the at least one beam cell according to a preset period.

A Doppler shift compensation method includes: receiving, by a terminal, Doppler compensation reference information set for at least one beam cell and sent by a network device; and obtaining, by the terminal, a corresponding terminal side Doppler compensation value on the basis of the Doppler compensation reference information, and performing, by the terminal, terminal side Doppler shift compensation for a communication link between a satellite and the terminal on the basis of the terminal side Doppler compensation value.

Optionally, the receiving, by the terminal, the Doppler compensation reference information set for the at least one beam cell and sent by the network device includes: receiving the Doppler compensation reference information sent by the network device through a broadcast message in a case that the terminal initially accesses the at least one beam cell; or receiving the Doppler compensation reference information sent by the network device through dedicated signaling in a case that the terminal is switched from another beam cell to the at least one beam cell.

Optionally, the dedicated signaling is any one of RRC indication signaling, DCI indication signaling, or MAC CE indication signaling.

Optionally, the obtaining, by the terminal, the corresponding terminal side Doppler compensation value on the basis of the Doppler compensation reference information includes: obtaining a preset Doppler compensation reference angle on the basis of the Doppler compensation reference information, and calculating and obtaining a network side Doppler compensation value on the basis of the Doppler compensation reference angle; calculating and obtaining a total Doppler compensation value on the basis of preset ephemeris information and a geographic location of the terminal; and calculating and obtaining the terminal side Doppler compensation value on the basis of the total Doppler compensation value and the network side Doppler compensation value; or, obtaining a preset network side Doppler compensation value on the basis of the Doppler compensation reference information; calculating and obtaining a total Doppler compensation value on the basis of the preset ephemeris information and the geographic location of the terminal; and calculating and obtaining the terminal side Doppler compensation value on the basis of the total Doppler compensation value and the network side Doppler compensation value.

Optionally, the terminal side Doppler compensation value includes: a Doppler shift post-compensation value for a downlink received signal, or, a Doppler shift pre-compensation value for an uplink transmitted signal.

Optionally, the performing, by the terminal, the terminal side Doppler shift compensation for the communication link between the satellite and the terminal on the basis of the terminal side Doppler compensation value includes: performing the terminal side Doppler shift compensation for a residual part of Doppler shift for the communication link between the satellite and the terminal by using the terminal side Doppler compensation value; or, performing the terminal side Doppler shift compensation for a total Doppler shift for the communication link between the satellite and the terminal by using the terminal side Doppler compensation value.

Optionally, the performing, by the terminal, the terminal side Doppler shift compensation for the communication link between the satellite and the terminal on the basis of the terminal side Doppler compensation value includes: performing terminal side Doppler shift pre-compensation for an uplink transmitted signal on the basis of the terminal side Doppler compensation value, or, performing terminal side Doppler shift post-compensation for a downlink received signal on the basis of the terminal side Doppler compensation value.

Optionally, the method further includes: performing, by the terminal, terminal side Doppler shift communication on the communication link between the satellite and the terminal on the basis of Doppler compensation reference information pre-defined by the terminal and the network device in a case that the terminal determines that the network device notifies the Doppler compensation reference information by default.

A Doppler shift compensation device, at least includes a processor, a memory and a transceiver, where the processor is configured to read a program in the memory and execute: obtaining Doppler compensation reference information set for at least one beam cell; and notifying a terminal accessing the at least one beam cell of the Doppler compensation reference information, and triggering the terminal to obtain a corresponding terminal side Doppler compensation value on the basis of the Doppler compensation reference information, and to perform terminal side Doppler shift compensation for a communication link between a satellite and the terminal on the basis of the terminal side Doppler compensation value; and the transceiver is configured to receive and send data under control of the processor.

Optionally, in a case of notifying the terminal accessing the at least one beam cell of the Doppler compensation reference information, the transceiver is configured to: notify the terminal of the Doppler compensation reference information through a broadcast message in a case of determining that the terminal initially accesses the at least one beam cell; or notify the terminal of the Doppler compensation reference information through dedicated signaling in a case of determining that the terminal is switched from another beam cell to the at least one beam cell.

Optionally, the dedicated signaling is any one of radio resource control (RRC) indication signaling, downlink control information (DCI) indication signaling, or media access control control element (MAC CE) indication signaling.

Optionally, the Doppler compensation reference information includes: a Doppler compensation reference angle, the Doppler compensation reference angle is an included angle between a movement direction of the satellite and a connecting line between the satellite and a reference point; and the Doppler compensation reference angle is used for calculating a network side Doppler compensation value used in a case that the device performs network side Doppler shift compensation for a communication link between the satellite and a terminal user; or the Doppler compensation reference information includes: a network side Doppler compensation value used in a case that the device performs network side Doppler shift compensation for the communication link between the satellite and the terminal.

Optionally, the network side Doppler compensation value includes: a Doppler shift pre-compensation value for a downlink transmitted signal, or, a Doppler shift post-compensation value for an uplink received signal.

Optionally, the processor is further configured to: determine the corresponding network side Doppler compensation value on the basis of the Doppler compensation reference information, and perform the network side Doppler shift compensation for the communication link between the satellite and the terminal on the basis of the network side Doppler compensation value.

Optionally, the processor is further configured to: further perform Doppler shift compensation for a feeder link in a case that a current working mode is a bent pipe communication mode.

Optionally, in a case of performing the network side Doppler shift compensation for the communication link between the satellite and the terminal on the basis of the network side Doppler compensation value, the processor is configured to: perform network side Doppler shift pre-compensation for the downlink transmitted signal on the basis of the network side Doppler compensation value, or, perform network side Doppler shift post-compensation for the uplink received signal on the basis of the network side Doppler compensation value.

Optionally, the processor is further configured to: perform network side Doppler shift compensation for a communication link between the satellite and a terminal user on the basis of Doppler compensation reference information pre-defined by the device and the terminal side in a case of notifying the terminal of the Doppler compensation reference information by default in the at least one beam cell.

Optionally, the processor is further configured to: update the Doppler compensation reference information of the at least one beam cell according to a preset period.

A Doppler shift compensation device at least includes a processor, a memory and a transceiver, where the processor is configured to read a program in the memory and execute: receiving Doppler compensation reference information set for at least one beam cell and sent by a network device; and obtaining a corresponding terminal side Doppler compensation value on the basis of the Doppler compensation reference information, and performing terminal side Doppler shift compensation for a communication link between a satellite and a terminal on the basis of the terminal side Doppler compensation value; and the transceiver is configured to receive and send data under control of the processor.

Optionally, in a case of receiving the Doppler compensation reference information set for the at least one beam cell and sent by the network device, the transceiver is configured to: receive the Doppler compensation reference information sent by the network device through a broadcast message in a case of initially accessing the at least one beam cell; or receive the Doppler compensation reference information sent by the network device through dedicated signaling in a case of being switching from another beam cell to the at least one beam cell.

Optionally, the dedicated signaling is any one of RRC indication signaling, DCI indication signaling, or MAC CE indication signaling.

Optionally, in a case of obtaining the corresponding terminal side Doppler compensation value on the basis of the Doppler compensation reference information, the processor is configured to: obtain a preset Doppler compensation reference angle on the basis of the Doppler compensation reference information, and calculate and obtain a network side Doppler compensation value on the basis of the Doppler compensation reference angle; calculate and obtain a total Doppler compensation value on the basis of preset ephemeris information and a geographic location of the device; and calculate and obtain the terminal side Doppler compensation value on the basis of the total Doppler compensation value and the network side Doppler compensation value; or, obtain a preset network side Doppler compensation value on the basis of the Doppler compensation reference information; calculate and obtain the total Doppler compensation value on the basis of the preset ephemeris information and the geographic location of the device; and calculate and obtain the terminal side Doppler compensation value on the basis of the total Doppler compensation value and the network side Doppler compensation value.

Optionally, the terminal side Doppler compensation value includes: a Doppler shift post-compensation value for a downlink received signal, or, a Doppler shift pre-compensation value for an uplink transmitted signal.

Optionally, in a case of performing the terminal side Doppler shift compensation for the communication link between the satellite and the terminal on the basis of the terminal side Doppler compensation value, the processor is configured to: perform the terminal side Doppler shift compensation for a residual part of Doppler shift for the communication link between the satellite and the terminal by using the terminal side Doppler compensation value; or, perform the terminal side Doppler shift compensation for a total Doppler shift for the communication link between the satellite and the terminal by using the terminal side Doppler compensation value.

Optionally, in a case of performing the terminal side Doppler shift compensation for the communication link between the satellite and the terminal on the basis of the terminal side Doppler compensation value, the processor is configured to: perform terminal side Doppler shift pre-compensation for an uplink transmitted signal on the basis of the terminal side Doppler compensation value, or, perform terminal side Doppler shift post-compensation for a downlink received signal on the basis of the terminal side Doppler compensation value.

Optionally, the processor is further configured to: perform the terminal side Doppler shift compensation for the communication link between the satellite and the terminal on the basis of Doppler compensation reference information pre-defined by the device and the network side in a case of determining that the network device notifies the Doppler compensation reference information by default.

A Doppler shift compensation device includes: an obtaining unit, configured to obtain Doppler compensation reference information set for at least one beam cell; and a compensation unit, configured to notify a terminal accessing the at least one beam cell of the Doppler compensation reference information, and trigger the terminal to obtain a corresponding terminal side Doppler compensation value on the basis of the Doppler compensation reference information, and to perform terminal side Doppler shift compensation for a communication link between a satellite and the terminal on the basis of the terminal side Doppler compensation value.

A Doppler shift compensation device includes: a communication unit, configured to receive Doppler compensation reference information set for at least one beam cell and sent by a network device; and a compensation unit, configured to obtain a corresponding terminal side Doppler compensation value on the basis of the Doppler compensation reference information, and perform terminal side Doppler shift compensation for a communication link between a satellite and a terminal on the basis of the terminal side Doppler compensation value.

A computer-readable storage medium stores computer-executable instructions, and the computer-executable instructions are configured to make a computer execute any method executed by a network device.

A computer-readable storage medium stores computer-executable instructions, and the computer-executable instructions are configured to make a computer execute any method executed by a terminal.

In the embodiments of the present disclosure, after obtaining the Doppler compensation reference information set for the at least one beam cell, the network device notifies the terminal accessing the at least one beam cell of the Doppler compensation reference information; and the terminal obtains the corresponding terminal side Doppler compensation value on the basis of the Doppler compensation reference information, and performs the terminal side Doppler shift compensation for the communication link between the satellite and the terminal on the basis of the terminal side Doppler compensation value. In this way, a solution is proposed for Doppler shift compensation for a satellite communication system. The network side indicates, to the terminal side, the Doppler compensation reference information preset for each beam cell in a satellite coverage area, so that the terminal accessing each beam cell can obtain the terminal side Doppler compensation value in time, thereby ensuring the consistency of the terminal side and the network side in Doppler shift compensation; and the terminal side and the network side can jointly compensate for and eliminate Doppler shift caused by satellite movement according to unified configuration information, and eliminate the impact of the Doppler shift to a maximum extent, thereby ensuring the communication performance of the system. Thus, the problem of Doppler shift compensation caused by satellite movement is effectively solved, the data communication performance of the terminal is ensured, and the service reliability of the satellite communication system is improved.

DETAILED DESCRIPTION OF THE EMBODIMENTS

In order to be able to track and compensate for the Doppler frequency on the basis of 5G transmission technologies, in the embodiments of the present disclosure, a network device (a base station or a gateway station) on a network side may uniformly configure corresponding Doppler compensation reference information for each beam cell (hereinafter referred to as cell) within the coverage of a satellite, and notify a terminal side of the configuration information, thereby ensuring the consistency of the network side and the terminal side in Doppler shift compensation. The Doppler shift compensation mentioned here is mainly for pre-compensation or post-compensation for Doppler shift caused by satellite movement, for example, adding an opposite Doppler shift value (i.e., a Doppler compensation value) to a carrier frequency of a transmitted signal or a received signal to eliminate the impact of the Doppler shift.

The preferred embodiments of the present disclosure will be described in further detail below with reference to the accompanying drawings.

Figure 1:
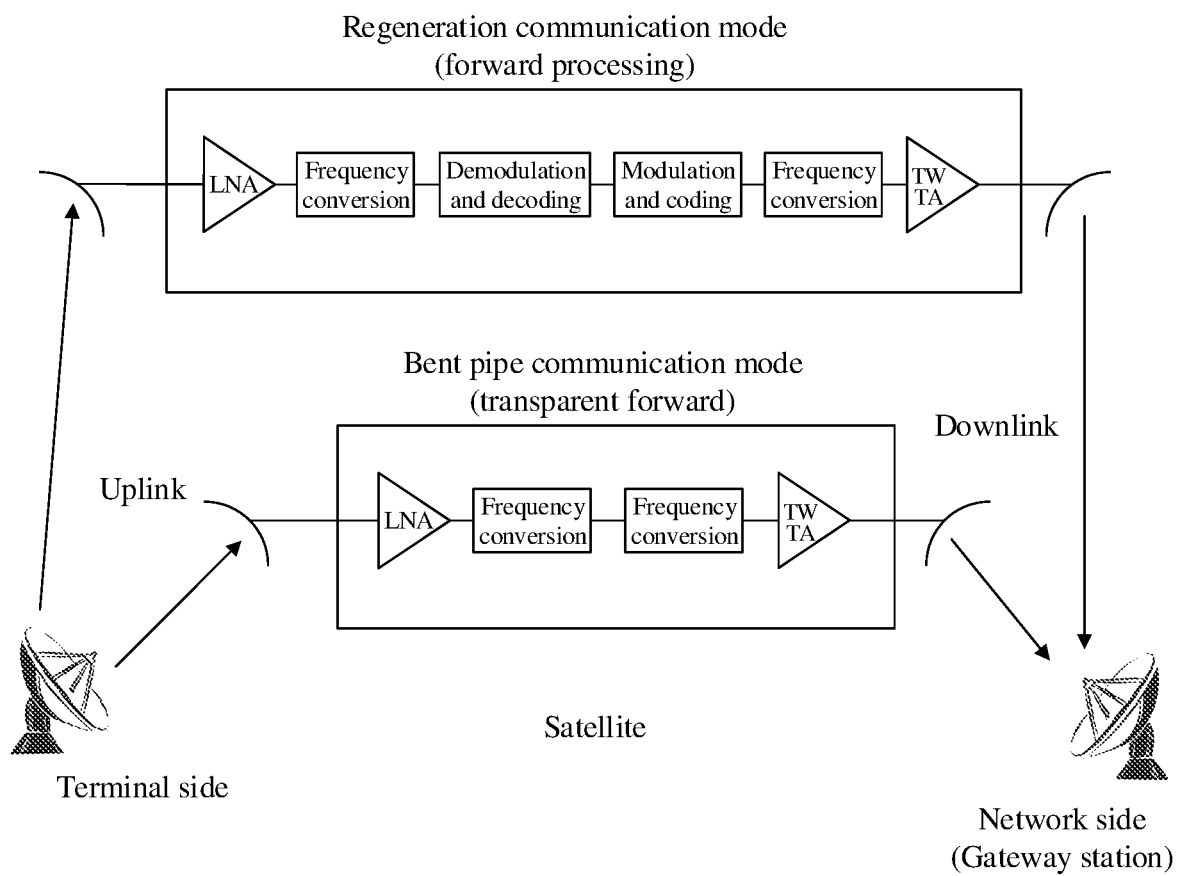
FIG. 1 is a schematic diagram of a working mode in satellite communications in the prior art.
Figure 2:
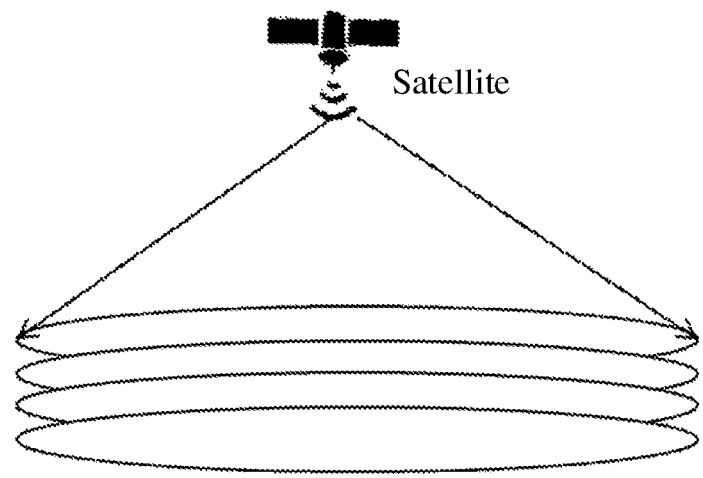
FIG. 2 is a schematic diagram of satellite signal coverage in satellite communications in the prior art.
Figure 3:
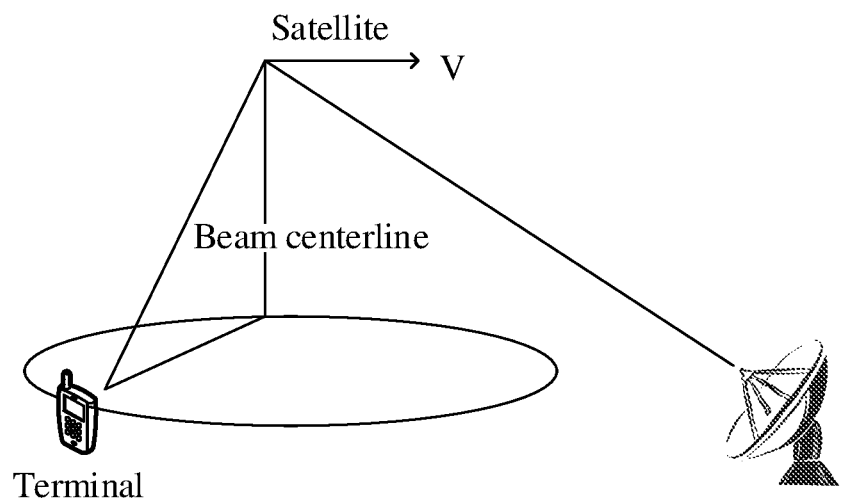
FIG. 3 is a schematic diagram of Doppler compensation for bent pipe satellite communications in the prior art.
Figure 4:
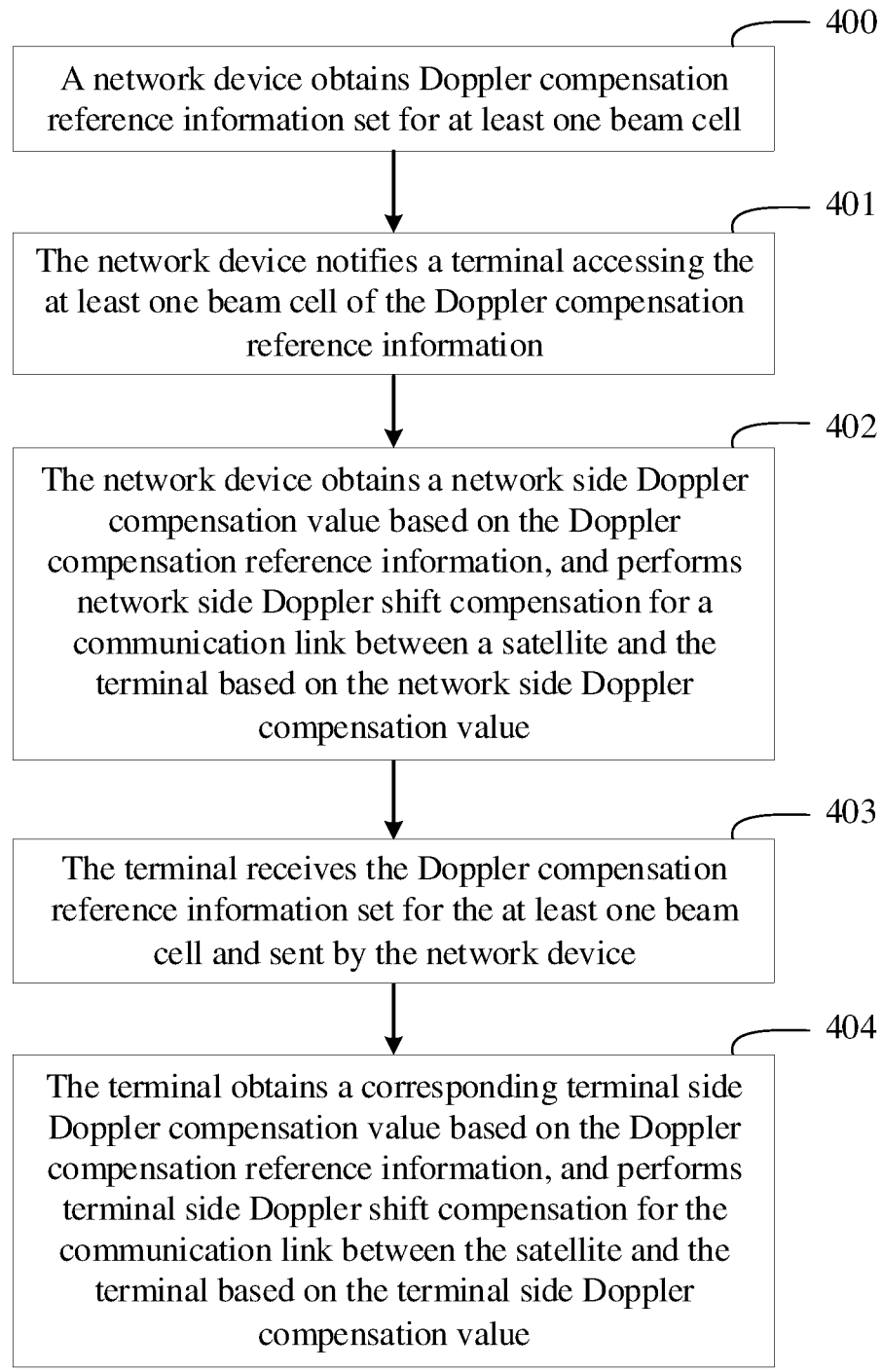
FIG. 4 is a schematic flow diagram of Doppler shift compensation in an embodiment of the present disclosure.

As shown in FIG. 4, in an embodiment of the present disclosure, the detailed process of Doppler shift compensation for a system signal by a network device and a terminal is as follows.

Step 400: the network device obtains Doppler compensation reference information set for at least one beam cell.

In the embodiments of the present disclosure, corresponding Doppler compensation reference information is set for different beam cells under the same satellite. Optionally, in order to simplify system processing operations, a plurality of beam cells under the same satellite may share the same Doppler compensation reference information. The Doppler compensation reference information includes, but is not limited to, the following two types.

Type 1: a Doppler compensation reference angle.

Figure 5:
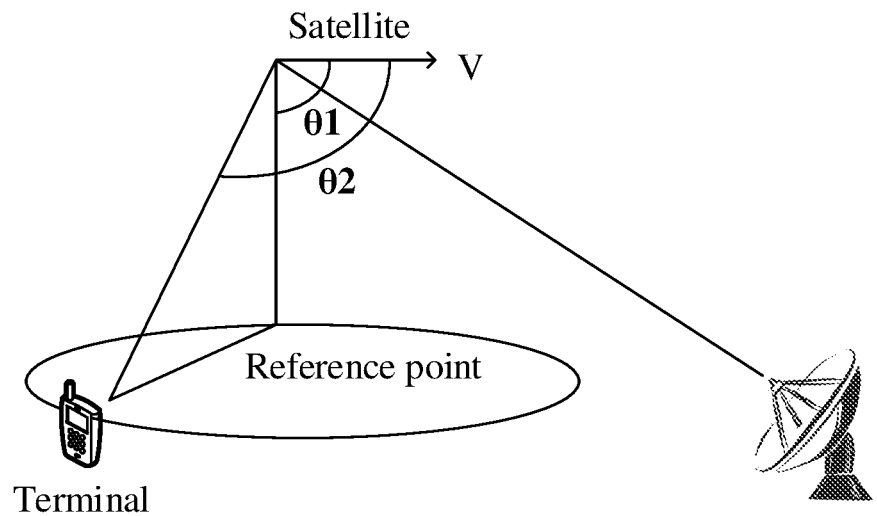
FIG. 5 is a schematic diagram of a Doppler compensation reference angle in an embodiment of the present disclosure.

As shown in FIG. 5, the Doppler compensation reference angle is an included angle, i.e., θ1, between the movement direction of a satellite and a connecting line between the satellite and a reference point.

The Doppler compensation reference angle may be configured to calculate a network side Doppler compensation value used when the network device performs network side Doppler shift compensation for a communication link between the satellite and a terminal user.

Optionally, the reference point may be on the ground, or on the satellite, which may be flexibly configured according to application environments.

Type 2: a network side Doppler compensation value.

The network side Doppler compensation value is a Doppler compensation value used when the network device performs network side Doppler shift compensation for a communication link between the satellite and the terminal.

Specifically, the network side Doppler compensation value may include: a Doppler shift pre-compensation value for a downlink transmitted signal, or a Doppler shift post-compensation value for an uplink received signal.

In the embodiments of the present disclosure, the network side Doppler compensation value that the network device needs to use may be expressed as formula (1).

$$f_{pre/post} = \frac{v}{c} \times f_c \times \cos\theta 1. \quad (1)$$

Where θ1 is the Doppler compensation reference angle, $f_c$ is a carrier frequency, v is a movement speed of the satellite, and c is a propagation speed of light.

Step 401: the network device notifies the terminal accessing the at least one beam cell of the Doppler compensation reference information.

The network device executes step 401 to trigger the corresponding terminal to obtain a corresponding terminal side Doppler compensation value on the basis of the Doppler compensation reference information, and to perform the terminal side Doppler shift compensation for the communication link between the satellite and the terminal on the basis of the terminal side Doppler compensation value. The specific details will be introduced in the subsequent embodiments.

Specifically, for step 401, for the sake of description, only one terminal accessing one beam cell is taken as an example. When the network device notifies the terminal of the Doppler compensation reference information, the several following modes may be used, but are not limited.

Mode a1: the terminal is notified of the Doppler compensation reference information by using a broadcast message, for example, a system information block (SIB).

Optionally, for a terminal initially accessing the one beam cell, the network device notifies the terminal of the Doppler compensation reference information by using the broadcast message.

Mode b1: the terminal is notified of the Doppler compensation reference information by using dedicated signaling.

Optionally, for the terminal switched from another beam cell to the one beam cell, the network device may notify the terminal of the Doppler compensation reference information by using the dedicated signaling, to help the terminal quickly complete Doppler shift compensation in the new beam cell.

The dedicated signaling may include, but is not limited to, radio resource control (RRC) indication signaling, downlink control information (DCI) indication signaling, or media access control control element (MAC CE) indication signaling and the like.

No matter which message or signaling is used, the network device needs to follow a preset message format.

For example, in order to effectively indicate the Doppler compensation reference angle, a large-angle coverage area needs to include [0, 180 degrees], and at most 8 bits of indication information is required.

For another example, for the Doppler compensation value, the maximum Doppler shift range needs to be considered, such as [−500 khz, 500 khz], the granularity is 1 khz, and at least 10 bits of indication information is required.

The terminal will obtain the corresponding terminal side Doppler compensation value on the basis of the Doppler compensation reference information, and perform Doppler compensation for the communication link between the satellite and the terminal by using the terminal side Doppler compensation value, which will be described in detail in subsequent embodiments.

Step 402: the network device obtains the network side Doppler compensation value based on the Doppler compensation reference information, and performs the network side Doppler shift compensation for the communication link between the satellite and the terminal by using the network side Doppler compensation value.

Optionally, the network device works out the network side Doppler compensation value on the basis of θ1 and formula (1), and perform the network side Doppler shift compensation for the communication link between the satellite and the terminal.

Specifically, in a bent pipe mode, when a value of θ1 is not 90 degrees, that is, when the reference point is on the ground, the network device will perform Doppler shift compensation for a common part of Doppler shift for the communication link between the satellite and the terminal on the basis of the network side Doppler compensation value. At the same time, the terminal is required to perform Doppler shift compensation for a residual part of Doppler shift for the communication link between the satellite and the terminal. The residual part means a remaining Doppler shift value after the network device performs common Doppler shift compensation.

Meanwhile, the network device also needs to perform Doppler shift compensation for a feeder link. The specific compensation mode is a mature technology, which will not be repeated here.

When the value of θ1 is 90 degrees, as shown in FIG. 5, the reference point may be regarded as on the satellite. At this moment, through formula (1), it may be seen that a value of the network side Doppler compensation value is 0. Therefore, in this case, the terminal needs to perform Doppler shift compensation for the total Doppler shift for the communication link between the satellite and the terminal, while the network device only needs to perform the Doppler shift compensation for the feeder link.

In a regeneration mode, when the value of θ1 is not 90 degrees, that is, when the reference point is on the ground, the network device will perform Doppler shift compensation for the common part of Doppler shift for the communication link between the satellite and the terminal on the basis of the network side Doppler compensation value. At the same time, the terminal is required to perform Doppler shift compensation for the residual part of Doppler shift for the communication link between the satellite and the terminal.

When the value of θ1 is 90 degrees, as shown in FIG. 5, the reference point may be regarded as on the satellite. At this moment, through formula (1), it may be seen that the value of the network side Doppler compensation value is 0. Therefore, in this case, the terminal needs to perform Doppler shift compensation for the total Doppler shift for the communication link between the satellite and the terminal.

Therefore, the network device will execute step 402 only when the value of θ1 is not 90 degrees, and may directly execute step 403 in other cases.

Further, in practical applications, unexpected situations may occur, which prevent the network device from successfully notifying the terminal of the Doppler compensation reference information set for each beam cell. For example, a newly-built beam cell has not yet set the Doppler compensation reference information, or, the network device fails to find the Doppler compensation reference information of a beam cell, or, the network device fails to send a notification message successfully. At this moment, in order to ensure the smooth progress of the compensation process, if the network device notifies the terminal of preset Doppler compensation reference information by default in at least one beam cell, the network device performs the network side Doppler shift compensation for the communication link between the satellite and the terminal on the basis of Doppler compensation reference information pre-defined by the network device and the terminal side. The specific compensation mode is the same as step 402, which will not be repeated here.

In steps 400-402, when the network device performs the network side Doppler shift compensation for the communication link between the satellite and the terminal, if the network side Doppler compensation value is a Doppler shift pre-compensation value for the downlink transmitted signal, the network device performs network side Doppler shift pre-compensation for the downlink transmitted signal on the basis of the network side Doppler compensation value; and if the network side Doppler compensation value is a Doppler shift post-compensation value for the uplink received signal, the network device performs network side Doppler shift post-compensation for the uplink received signal on the basis of the network side Doppler compensation value.

Step 403: the terminal receives the Doppler compensation reference information set for the at least one beam cell and sent by the network device.

Specifically, for the sake of description, still taking one terminal accessing one beam cell as an example, the terminal may receive the Doppler compensation reference information notified by the network device in the several following modes, which are not limited.

Mode a2: the Doppler compensation reference information sent by the network device is received through the broadcast message (for example, the SIB).

Optionally, when initially accessing the at least one beam cell, the terminal receives the Doppler compensation reference information sent by the network device through the broadcast message.

Mode b2: the Doppler compensation reference information sent by the network device is received through dedicated signaling.

Optionally, when the terminal is switched from another beam cell to the at least one beam cell, for example, when the terminal is being switched between beam cells, or during radio resource management (RRM) measurement for a new beam cell after switching, the terminal receives the Doppler compensation reference information sent by the network device through the dedicated signaling.

The dedicated signaling includes, but is not limited to, the RRC indication signaling, the DCI indication signaling, or the MAC CE indication signaling, etc.

Step 404: the terminal obtains the corresponding terminal side Doppler compensation value based on the Doppler compensation reference information, and performs the terminal side Doppler shift compensation for the communication link between the satellite and the terminal based on the terminal side Doppler compensation value.

Specifically, when the terminal obtains the corresponding terminal side Doppler compensation value on the basis of the Doppler compensation reference information, it includes, but is not limited to, the several following cases.

In a first case, the Doppler compensation reference information issued by the network device is the Doppler compensation reference angle.

Specifically, in the first case, the terminal may perform the following operations.

First, the terminal calculates to obtain the network side Doppler compensation value on the basis of the Doppler compensation reference angle. For details, please refer to formula (1).

Then, the terminal calculates to obtain a total Doppler compensation value on the basis of preset ephemeris information and the geographic location of the terminal.

Finally, the terminal calculates to obtain its own terminal side Doppler compensation value on the basis of the total Doppler compensation value and the network side Doppler compensation value.

Specifically, as shown in FIG. 5, the terminal determines the geographic location of the satellite on the basis of the ephemeris information, and determines the connecting line of the satellite and the terminal when the terminal combines the geographic location of the satellite with its own map location, thereby further determining the included angle, i.e., θ2, between the movement direction of the satellite and the connecting line between the satellite and the terminal.

Then, the terminal calculates the terminal side Doppler compensation value through the following formula 2.

$$f_{residule} = \frac{v}{c} \times f_c \times \cos\theta 2 - \frac{v}{c} \times f_c \times \cos\theta 1. \qquad (2)$$

Where, θ2 is the included angle between the movement direction of the satellite and the connecting line between the satellite and the terminal, θ1 is the Doppler compensation reference angle, $f_c$ is the carrier frequency, v is the movement speed of the satellite, c is the propagation speed of light, $$\frac{v}{c} \times f_c \times \cos\theta 1$$

is the network side Doppler compensation value, and $$\frac{v}{c} \times f_c \times \cos\theta 2$$

is the total Doppler compensation value.

In a second case, the Doppler compensation reference information issued by the network device is the network side Doppler compensation value.

Specifically, in the second case, the terminal may perform the following operations.

First, the terminal calculates to obtain the total Doppler compensation value on the basis of the preset ephemeris information and the geographic location of the terminal.

Then, the terminal calculates to obtain its own terminal side Doppler compensation value on the basis of the total Doppler compensation value and the network side Doppler compensation value.

Please refer to formula (2) for the specific principle, which will not be repeated here.

Furthermore, when formula (2) is used, if the network side Doppler compensation value is the Doppler shift pre-compensation value for the downlink transmitted signal, the terminal side Doppler compensation value calculated by the terminal is a Doppler shift post-compensation value for a downlink received signal; and correspondingly, if the network side Doppler compensation value is the Doppler shift post-compensation value for the uplink received signal, the terminal side Doppler compensation value calculated by the terminal is a Doppler shift pre-compensation value for an uplink transmitted signal.

On the other hand, when performing the terminal side Doppler shift compensation for the communication link between the satellite and the terminal on the basis of the terminal side Doppler compensation value, the terminal may also perform the following operations.

In the bent pipe mode, when the value of θ1 is not 90 degrees, that is, when the reference point is on the ground, the network device will perform the network side Doppler shift compensation for the communication link between the satellite and the terminal on the basis of the network side Doppler compensation value, that is, the network device will perform Doppler shift compensation for the common part of Doppler shift for the communication link between the satellite and the terminal, and correspondingly, the terminal needs to perform Doppler shift compensation for the remaining residual part. That is, at this moment, the terminal side Doppler compensation value calculated by the terminal is a compensation value for the residual part, and the terminal needs to perform the terminal side Doppler shift compensation for the residual part of Doppler shift for the communication link between the satellite and the terminal by using the terminal side Doppler compensation value.

When the value of θ1 is 90 degrees, as shown in FIG. 5, the reference point may be regarded as on the satellite. At this moment, through formula (1), it may be seen that the value of the network side Doppler compensation value is 0. Therefore, in this case, the terminal side Doppler compensation value calculated by the terminal is a compensation value for the total part, and the terminal needs to perform the terminal side Doppler shift compensation for the total Doppler shift for the communication link between the satellite and the terminal by using the terminal side Doppler compensation value.

Similarly, in the regeneration mode, when the value of θ1 is not 90 degrees, the network device performs the Doppler shift compensation for the common part of Doppler shift for the communication link between the satellite and the terminal, correspondingly, the terminal needs to perform the Doppler shift compensation for the remaining residual part. That is, at this moment, the terminal side Doppler compensation value calculated by the terminal is a compensation value for the residual part, and the terminal needs to perform the terminal side Doppler shift compensation for the residual part of Doppler shift for the communication link between the satellite and the terminal by using the terminal side Doppler compensation value.

When the value of θ1 is 90 degrees, as shown in FIG. 5, the reference point may be regarded as on the satellite. At this moment, through formula (1), it may be seen that the value of the network side Doppler compensation value is 0. Therefore, in this case, the terminal side Doppler compensation value calculated by the terminal is the compensation value for the total part, and the terminal needs to perform the terminal side Doppler shift compensation for the total Doppler shift for the communication link between the satellite and the terminal by using the terminal side Doppler compensation value.

Further, in practical applications, when unexpected situations occur, the terminal may not obtain the Doppler compensation reference information set for one beam cell from the network device in time. For example, when initially accessing one beam cell, the terminal may not successfully receive the notification message sent by the network device, or, the terminal does not receive the dedicated signaling sent by the network device. At this moment, in order to ensure the smooth progress of the compensation process, when the terminal determines that the network side notifies the preset Doppler compensation reference information for the at least one beam cell by default, the terminal will perform the terminal side Doppler shift compensation for the communication link between the satellite and the terminal on the basis of the Doppler compensation reference information pre-defined by the terminal and the network side. The specific compensation mode is the same as step 404, which will not be repeated here.

In steps 403-404, when the terminal performs the terminal side Doppler shift compensation for the communication link between the satellite and the terminal, if the terminal side Doppler compensation value is the Doppler shift pre-compensation value for the uplink transmitted signal, the terminal performs the terminal side Doppler shift post-compensation for the uplink transmitted signal, for example, a physical random access channel (PRACH) signal, on the basis of the terminal side Doppler compensation value; and if the terminal side Doppler compensation value is the Doppler shift post-compensation value for the downlink received signal, the terminal performs the terminal side Doppler shift pre-compensation for the downlink received signal on the basis of the terminal side Doppler compensation value.

On the basis of the above embodiments, in the embodiments of the present disclosure, when the Doppler compensation reference information corresponding to each beam cell is set, complex and flexible settings may be further performed according to the actual application environments. The main factors that need to be considered are as follows.

(1) Setting granularity of the Doppler compensation reference information: one for each satellite, or, one for each beam, or, one for a plurality of satellites. The finer the setting granularity, the more complicated the network side.

No matter which setting mode is adopted, when step 400 is executed, the network device can obtain the Doppler compensation reference information set for one beam cell. When one piece of information is set for each beam, the Doppler compensation reference information for each beam cell is not the same; and when one piece of information is set for each satellite, or, when one piece of information is set for the plurality of satellite, the Doppler compensation reference information of each beam cell is the same.

(2) The update frequency of the Doppler compensation reference information: for a beam, the Doppler compensation reference information may be set as a fixed value, or be updated periodically. The faster the update frequency, the higher the accuracy of Doppler compensation, but the operation complexity of the terminal side and the network side will increase relatively.

Therefore, if an update period is set, the network device needs to periodically update the Doppler compensation reference information set for each beam cell according to the set period.

(3) Whether uplink Doppler compensation reference information and downlink Doppler compensation reference information are consistent. Generally, the same reference angle is selected to simplify the implementation complexity of the network side.

The above embodiments are further described in detail below by using two specific application scenarios.

It should be noted that in the Doppler shift compensation, whether it is Doppler shift compensation for downlink signals or Doppler shift compensation for uplink signals, actual frequency shift includes: frequency shift of a crystal oscillator, Doppler shift caused by satellite movement, and Doppler shift caused by terminal movement. The Doppler shift compensation described in the embodiments of the present disclosure is only for the Doppler compensation process caused by satellite movement.

Scenario 1: the Doppler shift compensation for the downlink signals.

Assume that the downlink signal frequency of the terminal is expressed as: fdl=fdc+fsdp+fudp+fosi, where fdc is a downlink carrier frequency, fsdp is downlink Doppler shift caused by satellite movement, fdup is the Doppler shift caused by terminal movement, and fdosi is a frequency deviation caused by the inconsistency of a terminal crystal oscillator and a network side crystal oscillator, also referred to as an uplink crystal oscillator deviation.

The Doppler shift compensation described in the embodiments of the present disclosure refers to compensation for fsdp, which is specifically divided into two parts: network Doppler pre-compensation (fcsdp) performed by the network device on the common part, and the terminal Doppler shift post-compensation (fusdp) performed by the terminal on the residual part.

fcsdp is pre-compensation performed by the network device at a transmitting end, that is, the network side Doppler compensation value is calculated and compensated on the basis of a preset Doppler shift reference angle. The terminal calculates a remaining terminal Doppler shift compensation value fusdp on the basis of the ephemeris information and a physical location of the terminal after the terminal obtains the Doppler shift reference angle or directly obtains the network side Doppler compensation value.

The Doppler shift fudp caused by terminal movement, and the frequency shift fdosi between the terminal crystal oscillator and the network side crystal oscillator are obtained by further estimating the frequency on the basis of a synchronization signal or a downlink reference signal. The Doppler shift fudp caused by terminal movement may be compensated separately after being estimated out, and the error fdosi between the terminal crystal oscillator and the network side crystal oscillator may be corrected after being locked by a phase-locked loop.

Optionally, if the terminal does not obtain the network side Doppler compensation value, a value of each part of fusdp, fudp, and fdosi may still be estimated through the downlink synchronization signal or the reference signal.

Scenario 2: the Doppler shift compensation for the uplink signals.

Assuming that the signal receiving frequency of the network side of an uplink is expressed as: ful=fuc+fsup+fuup+fuosi, where fuc is an uplink carrier frequency, fsup is uplink Doppler shift caused by satellite movement, fdup is the Doppler shift caused by terminal movement, and fuosi is a frequency deviation caused by the inconsistency between the terminal crystal oscillator and the network side crystal oscillator, also referred to as a downlink crystal oscillator deviation.

The Doppler shift compensation for the uplink signals may also be divided into two parts: network Doppler shift post-compensation (fcsup) performed by the network device on the common part, and terminal Doppler shift pre-compensation (fusup) performed by the terminal on the residual part.

fcsup is post-compensation performed by the network device at a receiving end, that is, the network side Doppler compensation value fcsup is calculated and compensated on the basis of the preset Doppler shift reference angle. After the terminal obtains the Doppler shift reference angle or directly obtains the network side Doppler compensation value, the terminal calculates a remaining terminal side Doppler compensation value fusup on the basis of the ephemeris information and the physical location of the terminal.

Optionally, when an uplink Doppler shift reference angle and a downlink Doppler shift reference angle of the network side are the same, the terminal may derive an uplink terminal side Doppler compensation value, that is, fusup=(fuc/fdc)*fusdp, on the basis of a downlink terminal side Doppler compensation value, independent of the ephemeris information and the physical location of the terminal.

For the frequency deviation caused by the crystal oscillators, considering that the terminal and the network device each have only one crystal oscillator, the uplink crystal oscillator deviation may be obtained by converting the downlink crystal oscillator deviation, namely by using the formula (fuc+fuosi)=(fuc/fdc)*(fdc+fdosi).

Figure 6:
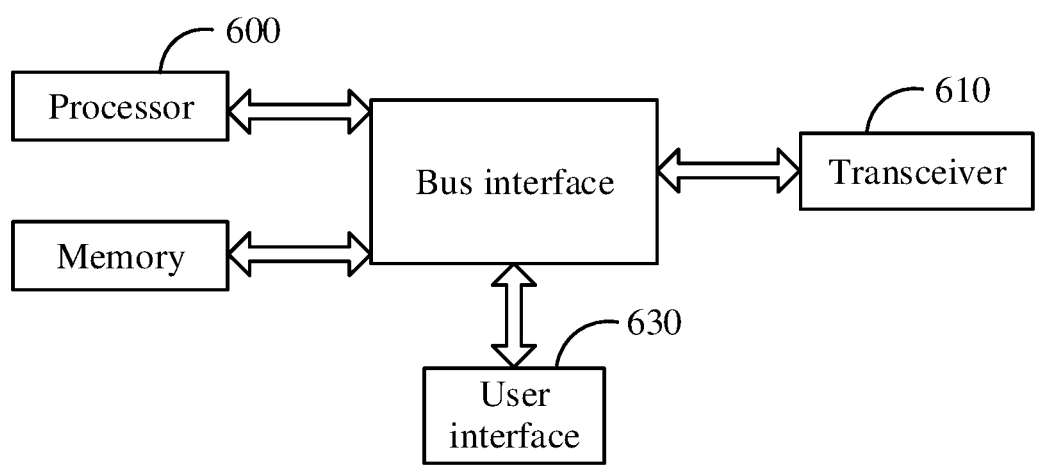
FIG. 6 is a schematic diagram of a physical structure of a network device in an embodiment of the present disclosure.

On the basis of the above embodiments, as shown in FIG. 6, an embodiment of the present disclosure provides a Doppler shift compensation device (for example, a network device), at least including a processor 600 and a transceiver 610.

The processor 600 is configured to read a program in a memory, and execute the following process: Doppler compensation reference information set for at least one beam cell is obtained; and a terminal accessing the at least one beam cell is notified of the Doppler compensation reference information, and the terminal is triggered to obtain a corresponding terminal side Doppler compensation value on the basis of the Doppler compensation reference information, and to perform terminal side Doppler shift compensation for a communication link between a satellite and the terminal on the basis of the terminal side Doppler compensation value.

The transceiver 610 is configured to receive and send data under control of the processor 600.

In FIG. 6, a bus architecture may include any number of interconnected buses and bridges, and specifically link together various circuits of one or more processors represented by the processor 600 and memories represented by the memory. The bus architecture may also link various other circuits such as peripheral devices, voltage regulators and power management circuits, which are well known in the art and, therefore, will not be described further herein. A bus interface provides an interface. The transceiver 610 may be a plurality of elements, namely, including a transmitter and a receiver, and provide a unit configured to communicate with various other apparatuses on a transmission medium. For different user devices, a user interface 630 may also be an interface capable of connecting externally and internally with required devices, including, but not limited to, a keypad, a display, a loudspeaker, a microphone, a joystick, and the like.

The processor 600 is responsible for managing the bus architecture and general processing, and the memory may store data used when the processor 600 performs operations.

Optionally, in a case of notifying the terminal accessing the at least one beam cell of the Doppler compensation reference information, the transceiver 610 is configured to: in a case of determining that the terminal initially accesses the at least one beam cell, notify the terminal of the Doppler compensation reference information through a broadcast message; or in a case of determining that the terminal is switched from another beam cell to the at least one beam cell, notify the terminal of the Doppler compensation reference information through dedicated signaling.

Optionally, the dedicated signaling is any one of RRC indication signaling, DCI indication signaling, or MAC CE indication signaling.

Optionally, the Doppler compensation reference information includes: a Doppler compensation reference angle. The Doppler compensation reference angle is an included angle between the movement direction of the satellite and a connecting line between the satellite and a reference point. The Doppler compensation reference angle is used for calculating a network side Doppler compensation value used in a case that the device performs network side Doppler shift compensation for a communication link between the satellite and a terminal user; or the Doppler compensation reference information includes: the network side Doppler compensation value used in a case that the network device performs the network side Doppler shift compensation for the communication link between the satellite and the terminal.

Optionally, the network side Doppler compensation value includes: a Doppler shift pre-compensation value for a downlink transmitted signal, or, a Doppler shift post-compensation value for an uplink received signal.

Optionally, the processor 600 is further configured to: determine a corresponding network side Doppler compensation value on the basis of the Doppler compensation reference information, and perform the network side Doppler shift compensation for the communication link between the satellite and the terminal on the basis of the network side Doppler compensation value.

Optionally, the processor 600 is further configured to: further perform Doppler shift compensation for a feeder link in a case that a current working mode is a bent pipe communication mode.

Optionally, in a case of performing network side Doppler shift compensation for the communication link between the satellite and the terminal on the basis of the network side Doppler compensation value, the processor 600 is configured to: perform network side Doppler shift pre-compensation for the downlink transmitted signal on the basis of the network side Doppler compensation value, or, perform network side Doppler shift post-compensation for the uplink received signal on the basis of the network side Doppler compensation value.

Optionally, the processor 600 is further configured to: in a case of notifying the terminal of the Doppler compensation reference information in the at least one beam cell by default, perform the network side Doppler shift compensation for the communication link between the satellite and the terminal user on the basis of Doppler compensation reference information pre-defined by the device and a terminal side.

Optionally, the processor 600 is further configured to: update the Doppler compensation reference information of the at least one beam cell according to a preset period.

Figure 7:
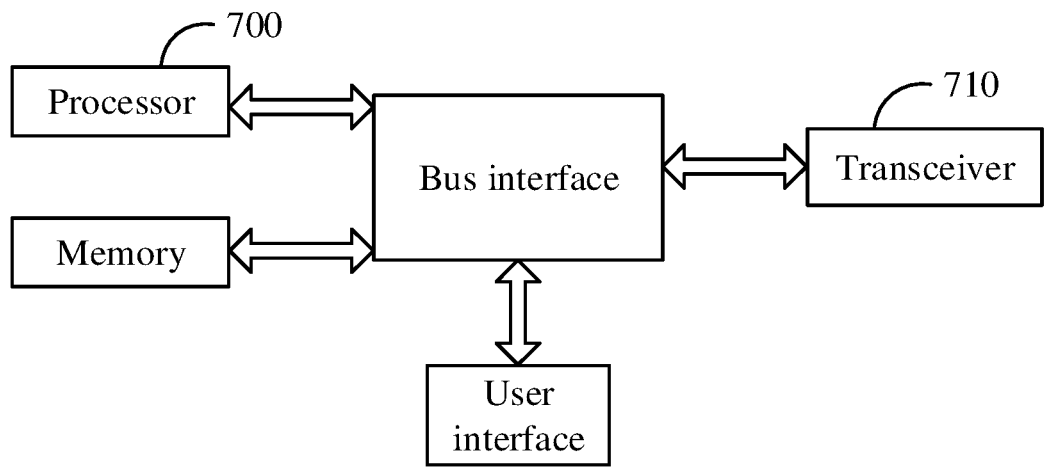
FIG. 7 is a schematic diagram of a physical structure of a terminal in an embodiment of the present disclosure.

On the basis of the above embodiments, as shown in FIG. 7, an embodiment of the present disclosure provides a Doppler shift compensation device (for example, a terminal), at least including a processor 700 and a transceiver 710.

The processor 700 is configured to read a program in a memory, and execute the following process: Doppler compensation reference information set for at least one beam cell and sent by a network device is received; and a corresponding terminal side Doppler compensation value is obtained on the basis of the Doppler compensation reference information, and terminal side Doppler shift compensation is performed on a communication link between a satellite and a terminal on the basis of the terminal side Doppler compensation value.

The transceiver 710 is configured to receive and send data under control of the processor 700.

In FIG. 7, a bus architecture may include any number of interconnected buses and bridges. The buses link together various circuits including one or more processors represented by the general-purpose processor 700 and memories represented by the memory. The buses may also link various other circuits such as peripheral devices, voltage regulators, and power management circuits, which are well known in the art and, therefore, will not be described further herein. A bus interface provides interfaces between the buses and the transceiver 710. The transceiver 710 may be one element or a plurality of elements, such as a plurality of receivers and transmitters, and provide a unit configured to communicate with various other apparatuses on a transmission medium. For example, the transceiver 710 receives external data from other devices. The transceiver 710 is configured to send data processed by the processor 700 to other devices. Depending on the nature of a computing system, a user interface may also be provided, such as a keypad, a display, a loudspeaker, a microphone, and a joystick.

The processor 700 is responsible for managing the buses and general processing, for example, running a general operation system as described above. The memory may be configured to store data used when the processor 700 performs operations.

Optionally, the processor 700 may be a central processing unit (CPU), an application specific integrated circuit (ASIC), a field programmable gate array (FPGA), or a complex programmable logic device (CPLD).

Optionally, in a case of receiving the Doppler compensation reference information set for the at least one beam cell and sent by the network device, the transceiver 710 is configured to: in a case of initially accessing the at least one beam cell, receive the Doppler compensation reference information sent by the network device through a broadcast message; and in a case of being switched from another beam cell to the at least one beam cell, receive the Doppler compensation reference information sent by the network device through dedicated signaling.

Optionally, the dedicated signaling is any one of RRC indication signaling, DCI indication signaling, or MAC CE indication signaling.

Optionally, in a case of obtaining the corresponding terminal side Doppler compensation value on the basis of the Doppler compensation reference information, the processor 700 is configured to: obtain a preset Doppler compensation reference angle on the basis of the Doppler compensation reference information, and calculate and obtain a network side Doppler compensation value on the basis of the Doppler compensation reference angle; calculate and obtain a total Doppler compensation value on the basis of preset ephemeris information and the geographic location of the device; and calculate and obtain the terminal side Doppler compensation value on the basis of the total Doppler compensation value and the network side Doppler compensation value; or, obtain the preset network side Doppler compensation value on the basis of the Doppler compensation reference information; calculate and obtain a total Doppler compensation value on the basis of the preset ephemeris information and the geographic location of the device; and calculate and obtain the terminal side Doppler compensation value on the basis of the total Doppler compensation value and the network side Doppler compensation value.

Optionally, the terminal side Doppler compensation value includes: a Doppler shift post-compensation value for a downlink received signal, or, a Doppler shift pre-compensation value for an uplink transmitted signal.

Optionally, in a case of performing the terminal side Doppler shift compensation for the communication link between the satellite and the terminal on the basis of the terminal side Doppler compensation value, the processor 700 is configured to: perform the terminal side Doppler shift compensation for a residual part of Doppler shift for the communication link between the satellite and the terminal by using the terminal side Doppler compensation value; or, perform the terminal side Doppler shift compensation for a total Doppler shift for the communication link between the satellite and the terminal by using the terminal side Doppler compensation value.

Optionally, in a case of performing the terminal side Doppler shift compensation for the communication link between the satellite and the terminal on the basis of the terminal side Doppler compensation value, the processor 700 is configured to: perform terminal side Doppler shift pre-compensation for the uplink transmitted signal on the basis of the terminal side Doppler compensation value, or, perform terminal side Doppler shift post-compensation for the downlink received signal on the basis of the terminal side Doppler compensation value.

Optionally, the processor 700 is further configured to: in a case of determining that the network device notifies the Doppler compensation reference information by default, perform the terminal side Doppler shift compensation for the communication link between the satellite and the terminal on the basis of Doppler compensation reference information pre-defined by the device and a network side.

Figure 8:
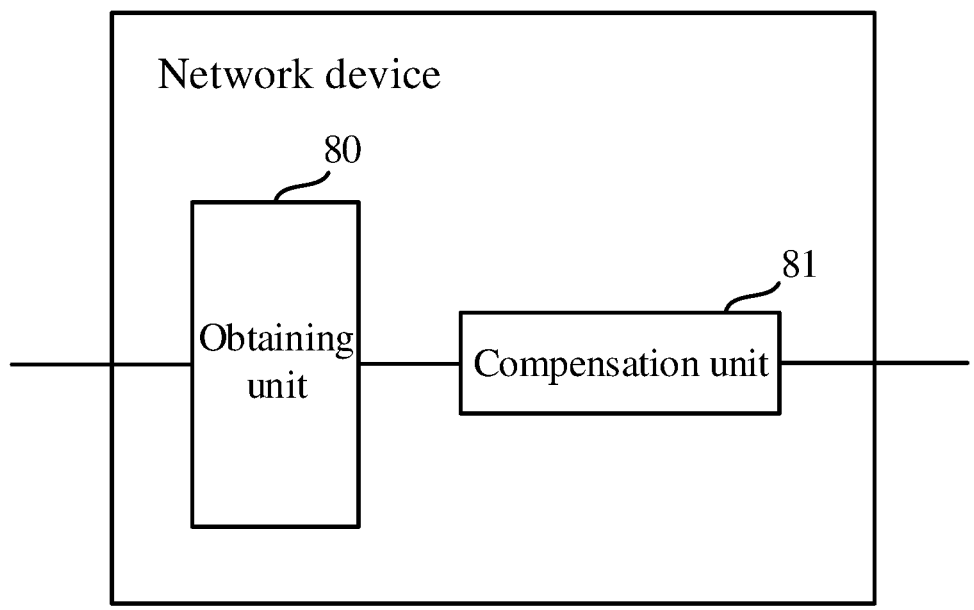
FIG. 8 is a schematic diagram of an implementation structure of a network device in an embodiment of the present disclosure.

On the basis of the same inventive concept, as shown in FIG. 8, an embodiment of the present disclosure provides a network device. The network device at least includes an obtaining unit 80 and a compensation unit 81.

The obtaining unit 80 is configured to obtain Doppler compensation reference information set for at least one beam cell.

The compensation unit 81 is configured to notify a terminal accessing the at least one beam cell of the Doppler compensation reference information, and trigger the terminal to obtain a corresponding terminal side Doppler compensation value on the basis of the Doppler compensation reference information, and to perform terminal side Doppler shift compensation for a communication link between a satellite and the terminal on the basis of the terminal side Doppler compensation value.

The functions of each unit in the above network device may refer to the description of the functions implemented by the network device in the foregoing embodiments, which will not be repeated here.

Figure 9:
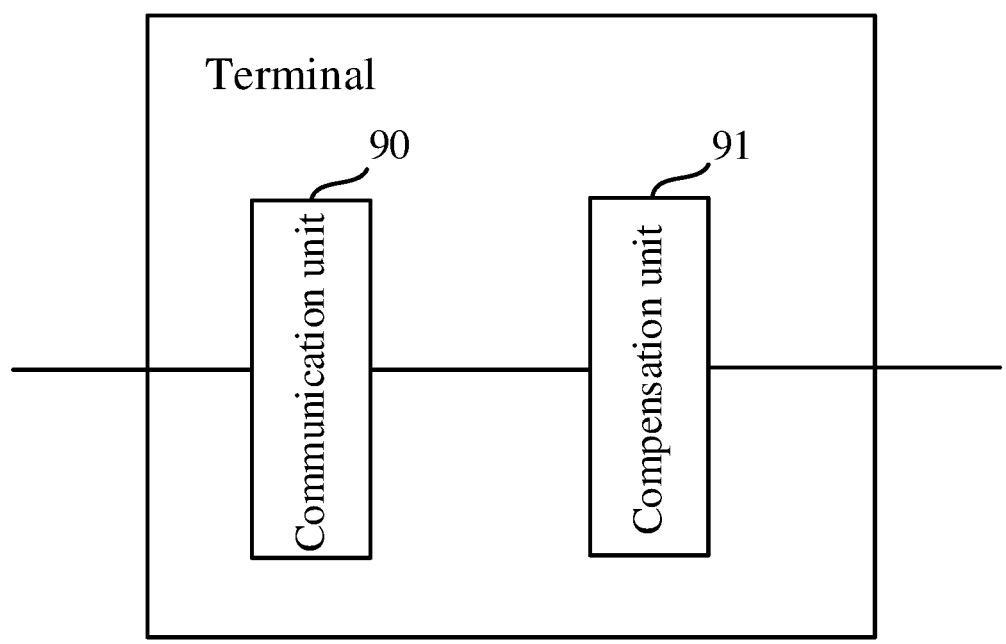
FIG. 9 is a schematic diagram of an implementation structure of a terminal in an embodiment of the present disclosure.

On the basis of the same inventive concept, as shown in FIG. 9, an embodiment of the present disclosure provides a terminal. The terminal at least includes a communication unit 90 and a compensation unit 91.

The communication unit 90 is configured to receive Doppler compensation reference information set for at least one beam cell and sent by a network device.

The compensation unit 91 is configured to obtain a corresponding terminal side Doppler compensation value on the basis of the Doppler compensation reference information, and perform terminal side Doppler shift compensation for a communication link between a satellite and the terminal on the basis of the terminal side Doppler compensation value.

The functions of each unit in the above network device may be referred to the description of the functions implemented by the terminal in the foregoing embodiments, which will not be repeated here.

On the basis of the same inventive concept, an embodiment of the present disclosure provides a computer-readable storage medium. The computer-readable storage medium stores computer-executable instructions, and the computer-executable instructions are configured to make a computer to execute any method executed by the network device in the above embodiments.

On the basis of the same inventive concept, an embodiment of the present disclosure provides a computer-readable storage medium. The computer-readable storage medium stores computer-executable instructions, and the computer-executable instructions are configured to make a computer to execute any method executed by the terminal in the above embodiments.

In summary, after obtaining the Doppler compensation reference information set for the at least one beam cell, the network device notifies the terminal accessing the at least one beam cell of the Doppler compensation reference information; and the terminal obtains the corresponding terminal side Doppler compensation value on the basis of the Doppler compensation reference information, and performs the terminal side Doppler shift compensation for the communication link between the satellite and the terminal on the basis of the terminal side Doppler compensation value. In this way, a solution is proposed for Doppler shift compensation for a satellite communication system. The network side indicates, to the terminal side, the Doppler compensation reference information preset for each beam cell in a satellite coverage area, so that the terminal accessing each beam cell can obtain the terminal side Doppler compensation value in time, thereby ensuring the consistency of the terminal side and the network side in Doppler shift compensation; and the terminal side and the network side can jointly compensate for and eliminate Doppler shift caused by satellite movement according to unified configuration information, and eliminate the impact of the Doppler shift to a maximum extent, thereby ensuring the communication performance of the system. Thus, the problem of Doppler shift compensation caused by satellite movement is effectively solved, the data communication performance of the terminal is ensured, and the service reliability of the satellite communication system is improved.

Those skilled in the art will appreciate that the embodiments of the present disclosure may be provided as a method, system, or computer program product. Thus, the present disclosure may take the form of an entirely hardware embodiment, an entirely software embodiment, or an embodiment combining software and hardware aspects. Moreover, the present disclosure may take the form of a computer program product implemented on one or more computer-usable storage media (including, but not limited to, a magnetic disk storage, a compact disc read-only memory (CD-ROM), an optical storage, and the like) having computer-usable program codes therein.

The present disclosure is described with reference to flowcharts and/or block diagrams of the method, the device (system), and the computer program product according to the embodiments of the present disclosure. It should be understood that each process and/or block in the flowcharts and/or block diagrams, and a combination of processes and/or blocks in the flowcharts and/or block diagrams can be realized by computer program instructions. These computer program instructions can be provided to a processor of a general-purpose computer, a special-purpose computer, an embedded processor, or other programmable data processing devices to generate a machine, so that an apparatus that realizes the functions specified in one process or multiple processes in the flowcharts and/or one block or multiple blocks in the block diagrams is generated through instructions executed by the processor of the computer or other programmable data processing devices.

These computer program instructions may also be stored in a computer-readable memory that may direct the computer or other programmable data processing devices to function in a specific manner, so that the instructions stored in the computer-readable memory produce an article of manufacture including an instruction apparatus. The instruction apparatus implements the functions specified in one process or multiple processes in the flowcharts and/or one block or multiple blocks in the block diagrams.

These computer program instructions may also be loaded on the computer or other programmable data processing devices, so that a series of operation steps are executed on the computer or other programmable devices to produce computer-implemented processing, so that the instructions executed on the computer or other programmable devices provide a step of implementing the function specified in a one process or multiple processes in the flowcharts and/or a block or multiple blocks in the block diagrams.

Although the preferred embodiments of the present disclosure have been described, additional variations and modifications can be made to these embodiments by those skilled in the art once the basic inventive concept is known. Therefore, it is intended that the appended claims be interpreted as including the preferred embodiments and all variations and modifications that fall within the scope of the present disclosure.

It will be apparent to those skilled in the art that various modifications and variations can be made to embodiments of the present disclosure without departing from the spirit or scope of the embodiments of the present disclosure. Thus, it is intended that the present disclosure cover the modifications and variations of the present disclosure provided they come within the scope of the appended claims and their equivalents.

What is claimed is:

1. A Doppler shift compensation method, comprising:
   obtaining, by a network device, Doppler compensation reference information set for at least one beam cell; and
   notifying, by the network device, a terminal accessing the at least one beam cell of the Doppler compensation reference information, and triggering the terminal to obtain a corresponding terminal side Doppler compensation value based on the Doppler compensation reference information, and to perform terminal side Doppler shift compensation for a communication link between a satellite and the terminal based on the terminal side Doppler compensation value;
   wherein the Doppler compensation reference information comprises: a Doppler compensation reference angle; the Doppler compensation reference angle is an included angle between a movement direction of the satellite and a connecting line between the satellite and a reference point; and the Doppler compensation reference angle is used for calculating a network side Doppler compensation value used in a case that the network device performs network side Doppler shift compensation for the communication link between the satellite and the terminal; or
   the Doppler compensation reference information comprises: a network side Doppler compensation value used in a case that the network device performs network side Doppler shift compensation for the communication link between the satellite and the terminal.

2. The method according to claim 1, wherein the notifying, by the network device, the terminal accessing the at least one beam cell of the Doppler compensation reference information comprises:
   notifying the terminal of the Doppler compensation reference information through a broadcast message in a case of determining that the terminal initially accesses the at least one beam cell; or
   notifying the terminal of the Doppler compensation reference information through dedicated signaling in a case of determining that the terminal is switched from another beam cell to the at least one beam cell;
   wherein the dedicated signaling is any one of radio resource control (RRC) indication signaling, downlink control information (DCI) indication signaling, or media access control control element (MAC CE) indication signaling.

3. The method according to claim 1, wherein the network side Doppler compensation value comprises:

a Doppler shift pre-compensation value for a downlink transmitted signal, or, a Doppler shift post-compensation value for an uplink received signal;

wherein the performing, by the network device, the network side Doppler shift compensation for the communication link between the satellite and the terminal based on the network side Doppler compensation value comprises:

performing network side Doppler shift pre-compensation for the downlink transmitted signal based on the network side Doppler compensation value, or, performing network side Doppler shift post-compensation for the uplink received signal based on the network side Doppler compensation value.

4. The method according to claim 1, further comprising:
determining, by the network device, the corresponding network side Doppler compensation value based on the Doppler compensation reference information; and performing, by the network device, the network side Doppler shift compensation for the communication link between the satellite and the terminal based on the network side Doppler compensation value.

5. The method according to claim 1, further comprising:
performing, by the network device, Doppler shift compensation for a feeder link in a case that a current working mode is a bent pipe communication mode.

6. The method according to claim 1, further comprising:
performing, by the network device, network side Doppler shift compensation for the communication link between the satellite and the terminal based on Doppler compensation reference information pre-defined by the network device and the terminal in a case that the network device notifies the terminal of the Doppler compensation reference information by default in the at least one beam cell.

7. The method according to claim 1, further comprising:
updating, by the network device, the Doppler compensation reference information of the at least one beam cell based on a preset period.

8. A Doppler shift compensation device, at least comprising a processor, a memory and a transceiver, wherein
the processor is configured to read a program in the memory and execute the method according to claim 1.

9. A Doppler shift compensation method, comprising:
receiving, by a terminal, Doppler compensation reference information set for at least one beam cell and sent by a network device;

obtaining, by the terminal, a corresponding terminal side Doppler compensation value based on the Doppler compensation reference information; and performing, by the terminal, terminal side Doppler shift compensation for a communication link between a satellite and the terminal based on the terminal side Doppler compensation value;

wherein the Doppler compensation reference information comprises: a Doppler compensation reference angle; the Doppler compensation reference angle is an included angle between a movement direction of the satellite and a connecting line between the satellite and a reference point; and the Doppler compensation reference angle is used for calculating a network side Doppler compensation value used in a case that the network device performs network side Doppler shift compensation for the communication link between the satellite and the terminal; or the Doppler compensation reference information comprises: a network side Doppler compensation value used in a case that the network device performs network side Doppler shift compensation for the communication link between the satellite and the terminal.

10. The method according to claim 9, wherein the receiving, by the terminal, the Doppler compensation reference information set for the at least one beam cell and sent by the network device comprises:

receiving the Doppler compensation reference information sent by the network device through a broadcast message in a case of initially accesses the at least one beam cell; or receiving the Doppler compensation reference information sent by the network device through dedicated signaling in a case of being switched from another beam cell to the at least one beam cell;

wherein the dedicated signaling is any one of radio resource control (RRC) indication signaling, downlink control information (DCI) indication signaling, or medium access control control element (MAC CE) indication signaling.

11. The method according to claim 9, wherein the obtaining, by the terminal, the corresponding terminal side Doppler compensation value based on the Doppler compensation reference information comprises:

obtaining a preset Doppler compensation reference angle based on the Doppler compensation reference information, and calculating and obtaining the network side Doppler compensation value based on the Doppler compensation reference angle; calculating and obtaining a total Doppler compensation value based on preset ephemeris information and a geographic location of the terminal; and calculating and obtaining the terminal side Doppler compensation value based on the total Doppler compensation value and the network side Doppler compensation value; or, obtaining a preset network side Doppler compensation value based on the Doppler compensation reference information; calculating and obtaining a total Doppler compensation value based on preset ephemeris information and a geographic location of the terminal; and calculating and obtaining the terminal side Doppler compensation value based on the total Doppler compensation value and the network side Doppler compensation value;

wherein the terminal side Doppler compensation value comprises:

a Doppler shift post-compensation value for a downlink received signal, or, a Doppler shift pre-compensation value for an uplink transmitted signal.

12. The method according to claim 9, wherein the performing, by the terminal, the terminal side Doppler shift compensation for the communication link between the satellite and the terminal based on the terminal side Doppler compensation value comprises:

performing the terminal side Doppler shift compensation for a residual part of Doppler shift for the communication link between the satellite and the terminal by using the terminal side Doppler compensation value; or, performing the terminal side Doppler shift compensation for a total Doppler shift for the communication link between the satellite and the terminal by using the terminal side Doppler compensation value.

13. The method according to claim 9, wherein the performing, by the terminal, the terminal side Doppler shift compensation for the communication link between the satellite and the terminal based on the terminal side Doppler compensation value comprises:
performing terminal side Doppler shift pre-compensation for an uplink transmitted signal based on the terminal side Doppler compensation value, or,
performing terminal side Doppler shift post-compensation for a downlink received signal based on the terminal side Doppler compensation value.

14. The method according to claim 9, further comprising:
performing, by the terminal, terminal side Doppler shift communication on the communication link between the satellite and the terminal based on Doppler compensation reference information pre-defined by the terminal and the network device in a case that the terminal determines that the network device notifies the Doppler compensation reference information by default.

15. A Doppler shift compensation device, at least comprising a processor, a memory and a transceiver, wherein
the processor is configured to read a program in the memory and execute:
receiving Doppler compensation reference information set for at least one beam cell and sent by a network device;
obtaining a corresponding terminal side Doppler compensation value based on the Doppler compensation reference information; and
performing terminal side Doppler shift compensation for a communication link between a satellite and a terminal based on the terminal side Doppler compensation value; and
the transceiver is configured to receive and send data under control of the processor;
wherein the Doppler compensation reference information comprises: a Doppler compensation reference angle; the Doppler compensation reference angle is an included angle between a movement direction of the satellite and a connecting line between the satellite and a reference point; and the Doppler compensation reference angle is used for calculating a network side Doppler compensation value used in a case that the network device performs network side Doppler shift compensation for the communication link between the satellite and the terminal; or
the Doppler compensation reference information comprises: a network side Doppler compensation value used in a case that the network device performs network side Doppler shift compensation for the communication link between the satellite and the terminal.

16. The device according to claim 15, wherein in a case of receiving the Doppler compensation reference information set for the at least one beam cell and sent by the network device, the transceiver is configured to:
receive the Doppler compensation reference information sent by the network device through a broadcast message in a case of initially accesses the at least one beam cell; or
receive the Doppler compensation reference information sent by the network device through dedicated signaling in a case of being switched from another beam cell to the at least one beam cell;

wherein the dedicated signaling is any one of radio resource control (RRC) indication signaling, downlink control information (DCI) indication signaling, or media access control control element (MAC CE) indication signaling.

17. The device according to claim 15, wherein in a case of obtaining the corresponding terminal side Doppler compensation value based on the Doppler compensation reference information, the processor is configured to:
obtain a preset Doppler compensation reference angle based on the Doppler compensation reference information, and calculate and obtain thea network side Doppler compensation value based on the Doppler compensation reference angle; calculate and obtain a total Doppler compensation value based on preset ephemeris information and a geographic location of the device; and calculate and obtain the terminal side Doppler compensation value based on the total Doppler compensation value and the network side Doppler compensation value;
or,
obtain a preset network side Doppler compensation value based on the Doppler compensation reference information; calculate and obtain a total Doppler compensation value based on preset ephemeris information and a geographic location of the device; and calculate and obtain the terminal side Doppler compensation value based on the total Doppler compensation value and the network side Doppler compensation value;
wherein the terminal side Doppler compensation value comprises:
a Doppler shift post-compensation value for a downlink received signal, or, a Doppler shift pre-compensation value for an uplink transmitted signal.

18. The device according to claim 15, wherein in a case of performing the terminal side Doppler shift compensation for the communication link between the satellite and the terminal based on the terminal side Doppler compensation value, the processor is configured to:
perform terminal side Doppler shift pre-compensation for an uplink transmitted signal based on the terminal side Doppler compensation value, or,
perform terminal side Doppler shift post-compensation for a downlink received signal based on the terminal side Doppler compensation value.

19. The device according to claim 15, wherein the processor is further configured to:
perform the terminal side Doppler shift compensation for the communication link between the satellite and the terminal based on Doppler compensation reference information pre-defined by the device and the network device in a case of determining that the network device notifies the Doppler compensation reference information by default.

* * * * *